United States Patent [19]

Nilsson et al.

[11] Patent Number: 4,477,101
[45] Date of Patent: Oct. 16, 1984

[54] ARRANGEMENT FOR COUPLING AN IMPLEMENT TO A TRACTOR

[75] Inventors: Rolf Nilsson, Eskilstuna; Nils-Georg Lindström, Stora Sundby, both of Sweden

[73] Assignee: Tunamatic Handelsbolag, Eskilstuna, Sweden

[21] Appl. No.: 368,061

[22] Filed: Apr. 13, 1982

[30] Foreign Application Priority Data

Apr. 15, 1981 [SE] Sweden ............... 8102431

[51] Int. Cl.³ .............................................. B60D 7/00
[52] U.S. Cl. ................................ 280/461 A; 172/272; 172/275; 280/446 A; 280/460 A; 280/490 A; 414/723; 414/724
[58] Field of Search ............ 280/415.1, 446 A, 456 A, 280/460 A, 461 A, 479 A, 490 A; 172/272, 275; 414/723, 724

[56] References Cited

U.S. PATENT DOCUMENTS

| 3,306,630 | 2/1967 | Weiste | 172/272 |
| 3,672,521 | 6/1972 | Bauer et al. | 414/723 |
| 3,794,195 | 2/1974 | Clevenger et al. | 414/723 |
| 4,243,356 | 1/1981 | Takojima | 414/723 |

FOREIGN PATENT DOCUMENTS

| 1111866 | 7/1961 | Fed. Rep. of Germany | 172/272 |
| 923241 | 6/1955 | France | 414/723 |
| 1110361 | 4/1968 | United Kingdom | 172/272 |
| 1568052 | 5/1980 | United Kingdom | 172/272 |

Primary Examiner—Joseph F. Peters, Jr.
Assistant Examiner—Kenneth R. Rice
Attorney, Agent, or Firm—Pollock, Vande Sande & Priddy

[57] ABSTRACT

Arrangement for coupling an implement to a hydraulically operated coupling device on a tractor, said arrangement comprising a male coupling frame attached to the tractor and cooperating with a female coupling frame attached to the implement, the arrangement in coupled position providing a power transmitting union. Power transmission is effected via an upper union where the coupling beams of the female frame straddle the corresponding guide beams of the male frame, and by two lower coupling devices consisting of catch hooks on the male frame and interacting coupling hooks on the female frame. The coupling members are locked and released by a separate spring-loaded latch provided with an indicating lever to which an operating mechanism has been attached.

5 Claims, 6 Drawing Figures

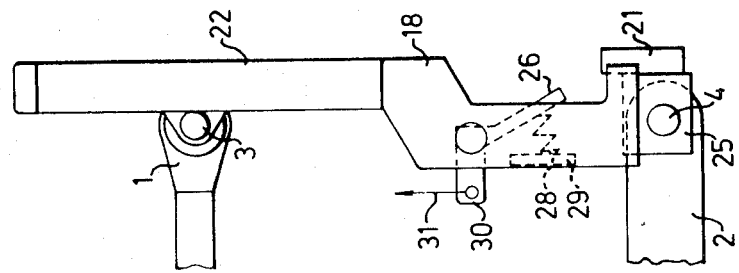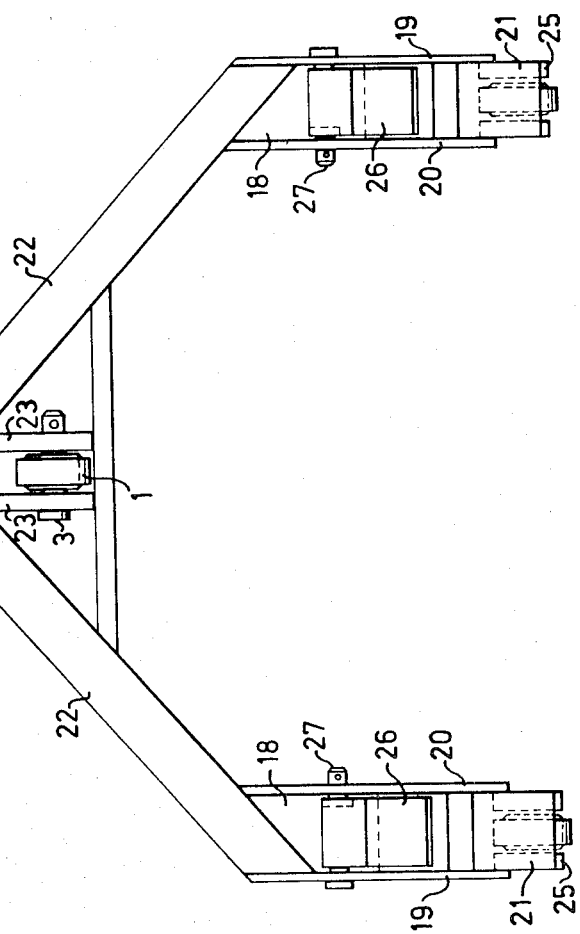

ARRANGEMENT FOR COUPLING AN IMPLEMENT TO A TRACTOR

The present invention relates to a device for coupling an implement to an hydraulically operated coupling device on a tractor.

A variety of different implements are coupled to tractors. Most of the implements are coupled to the rear of the tractor, and some are front-mounted. Special towing devices have been arranged for drawn implements. Many implements are completely or partially carried by the tractor by coupling together the implement and a hydraulically operated so-called 3-point coupling on the tractor. To facilitate the use of the 3-point coupling, there are special attachments which make it possible for the operator to couple together the tractor and the implement while sitting in the operator's seat. It was in connection with the development of such an attachment that the idea for the present invention arose.

The coupling points of the 3-point coupling, their relative positions and positions relative to the tractor, and the lift geometry of the coupling arrangement, have been subject to extensive international standardization. FIG. 1 shows an extract from such a standard, and the component parts.

By hydraulically actuating the lift rods 11, it is possible to produce a raising or lowering movement in the 3-point coupling. The length of the top link 1 can be varied either mechanically, or as in the present invention, by the top link being a hydraulic operating cylinder. The lower hitch points must be adjustable to different relative heights. This is done by actuating the lift rod gear 12 which in the present invention has been replaced by a hydraulic operating cylinder. It is the hitch points 3 and 4 in FIG. 1 which in the present invention are connected to a special coupling device which is compatible with a corresponding device attached to the implement by means of its hitch pins 7 and 8. Many implements have, however, non-standard hitch points, making the desired adaption more difficult.

The invention relates to a coupling arrangement fixed, as stated above, to the tractor and to the implement, which makes it possible for the tractor operator to couple together or uncouple the tractor and implement without assistance and without having to leave the operator seat. The following is a list of requirements for an effectively functioning coupling arrangement:

- The coupling operation must be easily actuated and controlled from the operator's seat.
- It must provide simple coupling and uncoupling without requiring precision maneuvering for coupling.
- It must provide positive coupling even when there is moderate obliqueness and/or lateral displacement of the tractor relative to the implement, and move the implement only slightly during coupling.
- The coupling operation must be easily visible from the operator's seat.
- The coupling arrangement must have a reliable locking mechanism the correct functioning of which must be determinable from the operator's seat.
- The lock mechanism must not take up the forces transmitted between the tractor and implement.
- The functioning of the lock mechanism must not be sensitive to dirt or ice.
- The coupling arrangement must have a small longitudinal dimension so that the implement can be coupled close to the tractor, thus providing good stability and steering capacity for the tractor. For road use, there are legal requirements on the tractor front wheel pressure against the road surface. It there is a large rear overhang, it may be necessary to provide the front of the tractor with counter weights, providing undesirable increased load on the wheels and axles, which should be avoided.
- The coupling arrangement should provide a large clearance for parts extending from the implement, e.g., spring loaded trigger devices for plows.
- The coupled tractor frame and implement frame must provide a stable union.
- The coupling arrangement must not appreciably reduce the free space behind the tractor in those cases where a protected power transmission shaft has been coupled to the tractor power take-off.
- The coupling arrangement must be safe, especially in those cases where a person is forced to work behind the tractor for connecting a power transmission shaft.
- The arrangement must be correctly designed with regard to strength of materials.
- The coupling arrangement must be reasonable in capital outlay and simple in application.

Known coupling arrangements do not fulfill all of the above requirements. The present invention, however, fulfills in an entirely novel and unique way the list of requirements. An embodiment of the inventive idea will be described in more detail with the aid of the accompanying drawings of which:

FIG. 2 shows a coupling frame for a tractor, in rear view towards the tractor

FIG. 3 shows the coupling frame according for FIG. 2 as seen from the side

THE COUPLING FRAME ON THE TRACTOR (THE MALE PART)

Figure 1:
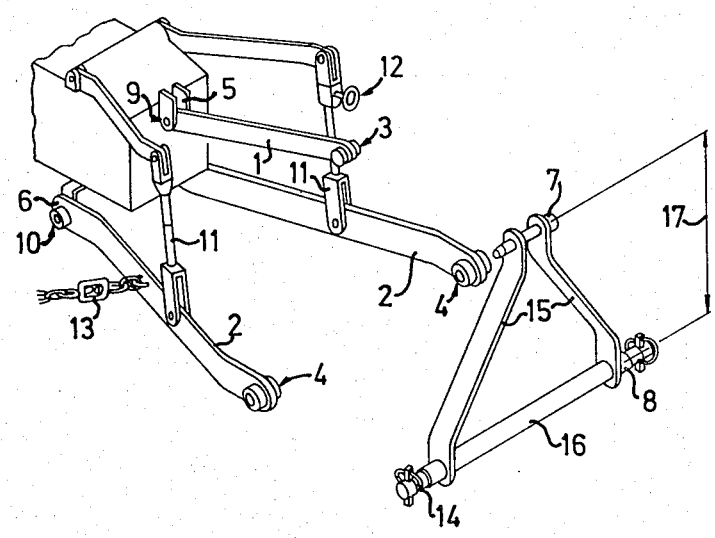
FIG. 1 shows the principle of a so-called three-point coupling
Figure 5:
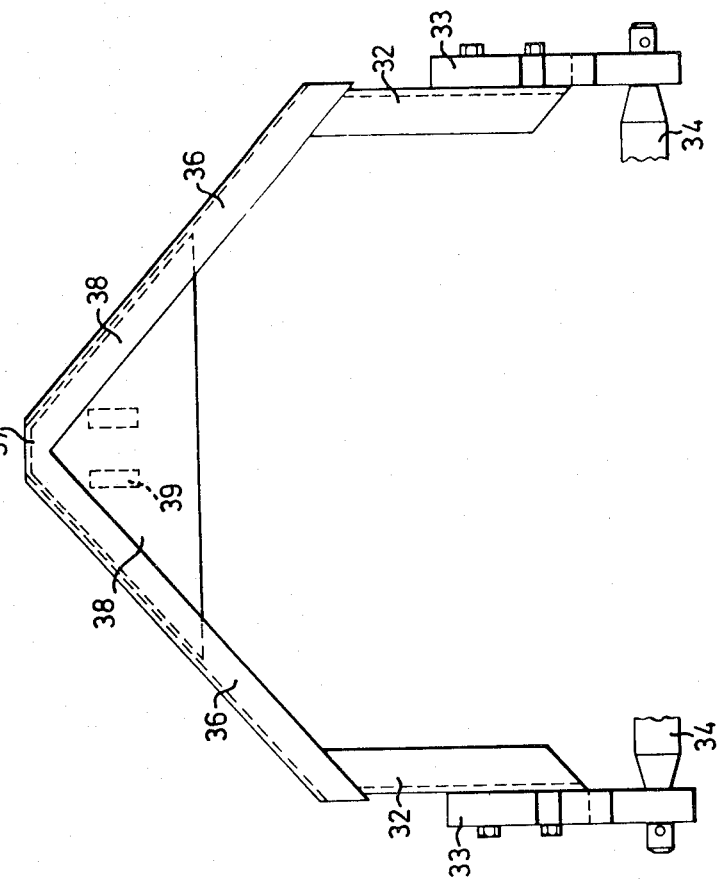
FIG. 5 shows the same frame viewed from the rear, in the normal direction of movement of the tractor
Figure 4:
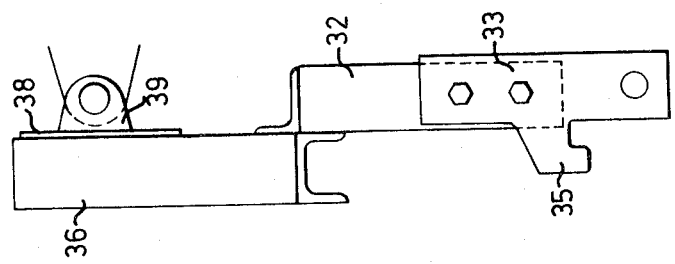
FIG. 4 shows an interacting coupling frame on the implement as seen from the side

As revealed in FIGS. 2 and 3, the coupling frame comprises two vertical frame members 18 placed on either side of the line of symmetry of the tractor. Each of the frame members consists of two side pieces 19 and 20 which are connected to a catch hook 21 at the bottom. The side pieces 19 and 20 are joined at the top to an inclined guide beam 22. The symmetrically placed guide beams 22 form together a V with an angle between the guide beams which should preferably be obtuse. At the tip of the frame construction, a mount 23 is arranged for attaching the top link 1 of the tractor. A special guide projection 24 is arranged on the top of the coupling frame.

At the bottom of each frame member 18, there is a mount 25 for mounting the lower hitch points 4 on the lower links 2 of the tractor.

The geometric dimensions of the frame construction are determined primarily by the standardized distances between the lower hitch points 4 of the tractor and the vertical distance between them and the upper connection point 3.

This design of the coupling frame, which is opened downwards, provides a large interior free space which is of importance.

Between the side pieces 19 and 20 there is placed a latch 26. It is rotatable about a clevis pin 27 and is loaded by a spring 28 fixed at its other end against a spring stop 29. The latch is provided with a lever 30 to which an operating means 31 has been connected. By pulling the operating means 31, it is possible to rotate the latch 26 from a locking position to a free position.

THE COUPLING FRAME ON THE IMPLEMENT (THE FEMALE PART) FIGS. 4 AND 5

The coupling frame on the implement has two vertically placed frame members 32, each provided at the bottom with a mount 33 for fixing the implement (exemplified here by the support bar 34 of a plow). These mounts are designed with coupling hooks 35. The coupling hooks are spaced so that they coincide with the position of the catch hooks 21 on the tractor frame.

The frame members 32 are connected at the top to symmetrically placed coupling beams 36, which are U-beams with the legs pointing downwards. The distance between the legs on the beams 36 is selected so as to be able to straddle the guide beams 22 of the tractor frame in the coupling position.

The interior limiting surfaces of the coupling beams 36 coincide with the geometric external shape of the guide beams 22 of the tractor frame. An opening 37 is arranged at the top where the coupling beams 36 meet, said opening cooperating, for coupling, with the guide projection 24 on the tractor frame.

A rear wall 38 is arranged on the upper portion of the implement frame, having the dual purposes of reinforcing the frame and assisting in the coupling together of the frames. The rear wall is provided with a mount 39 which is to be coupled to the corresponding hitch point on the implement.

Implement hitch points can vary greatly due to the variety of existing implements. Therefore the mounting arrangement shown here is to be regarded only as one of many examples.

FUNCTION

The coupling frames are mounted on the tractor and on the implement.

For coupling, the tractor is driven towards the implement. Before the male part on the tractor reaches the female part on the implement, the top of the male part is inclined backwards somewhat by activating the hydraulic top link cylinder 1. With the aid of the tractor, the guide projection 24 of the male part is moved towards the downwardly directed coupling beams 36 of the female part, the rear wall 38 assisting in the guiding of the top of the male part. The guide projection will then mode between the legs of the coupling beams 36. By raising the male part with the hydraulic lift of the tractor and at the same time bringing the male part to a vertical position by reducing the length of the top link 1 with the cylinder, the coupling beams 36 of the female part will slide onto the guide beams 22 of the male part. As the tractor hydraulic system lifts and pulls the female part towards the male part, the coupling hooks 35 on the female part will be pulled in towards and over the cooperating catch hooks 21 on the male part. At the end of the coupling movement, the projection 24 on the male part is guided into the opening 37 in the female part. The coupling movement is ended when the legs of the coupling beams 36 of the female part are straddled over the guide beams 22 of the male part. The coupling beams 36 of the female part descend over the guide beams 22 on the male part and at the same time the lower coupling hooks 35 engage the catch hooks 21 on the male part.

Towards the end of the coupling movement, the spring-loaded latch 26 has been pressed in by the coupling hook 35 and when the coupling between the female and male parts is completed, the spring 28 presses the latch 26 back to the lock position. The function of the latch 26 is to lock the coupling frames together, and it does not participate in the force transmission from the tractor frame to the implement frame when the tractor with implement is in operation.

By looking at the lever 30 of the latch 26 it is possible for the operator to check from the operator's seat that the latch has assumed the lock position.

The coupling can be carried out even if the tractor is displaced somewhat angularly or laterally in relation to the implement. In the coupling operation, the coupling beams 36 of the female part will also be turned relative to the guide beams 22 of the male part, until the positions of the coupling beams and the guide beams coincide and the coupling is then completed.

The lift rod gear 12 facilitates coupling of implements standing on uneven ground or when the implement is inclined laterally. The lift rod gear 12 can twist the tractor frame so that its lateral inclination agrees with that of the implement frame.

Figure 6:
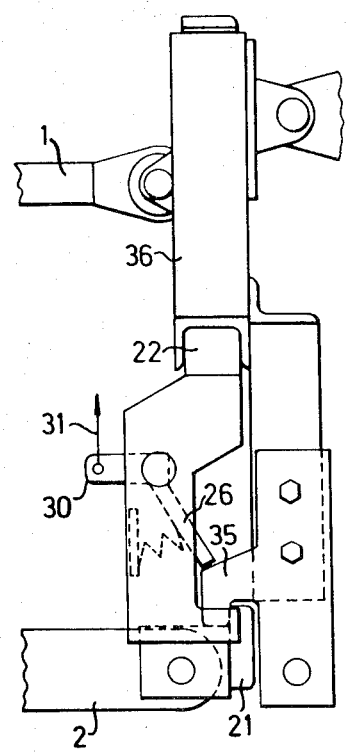
FIG. 6 shows a side view of the coupling frames on the tractor and on the implement coupled together.

FIG. 6 shows the two parts coupled completely together.

For uncoupling, the operating means 31 of the latches are actuated by the tractor operator so that the latches 26 release the coupling hooks 35. The implement is then lowered with the hydraulic lift so that the parking stands rest on the ground. As the lowering movement is continued, the tractor frame is lowered, and disengages from the implement frame. The lowering movement is effected only by the weight of the lift means and the tractor frame, and in order for the tractor frame to be lowered and freed from the implement frame, it can be necessary to extend or retract the hydraulic top link 1 if the tractor frame and the implement frame have become stuck together.

When disengaging and parking an implement on uneven ground, it may even be necessary to adjust the lift rod gear 12 so that the tractor frame can be freed from the implement frame.

The invention described above has fulfilled all of the requirements in the above list of requirements.

The invention is not limited to the above embodiment. For example, the coupling arrangement can be applied not only to 3-point tractor couplings, but also to a front-mounted tractor coupling for mounting a front loader or other front-mounted tractor implement.

What we claim is:

1. Arrangement for coupling an implement to an hydraulically operated coupling device on a tractor having a driver's seat and hydraulic lift means, said arrangement comprising
   (a) a male coupling frame attached to said tractor and comprising
      (i) two coupling guide beams (22) extending downwardly at an obtuse angle to one another to form an inverted V open at the bottom;

(ii) vertical frame members (18) attached to and extending downwardly from the lower ends of each of said coupling guide beams (22), and having catch hooks (21) at the lower ends thereof;

(b) a female coupling frame attached to said implement and cooperating with said male coupling frame to form a unit in coupled position, said female coupling frame comprising (i) two substantially U-shaped coupling beams (36) extending downwardly at substantially the same obtuse angle to one another as said coupling guide beams (22) to form an inverted V open at the bottom and fitting over said coupling guide beams (22) of said male coupling frame in coupled position;

(ii) vertical frame members (32) attached to and extending downwardly from the lower ends of each of said coupling beams (36), the distance between said frame members (32) being so selected that said frame members (32) straddle said guide beams (22) of said male coupling frame in coupled position; and (iii) a mount (33) provided with a coupling hook (35) at the lower end of each of said vertical frame members (32) for engagement with said catch hooks (21), the vertical distance from the lower edges of said coupling beams (36) to the lower edges of said coupling hooks (35) being so selected that, during the coupling operation, said coupling hooks (35) slide over said catch hooks (21), and that, in coupled position, said coupling hooks (35) are in firm contact with said catch hooks (21);

(c) a guide projection (24) from the top of said male coupling frame which, upon coupling of said male and female coupling frames, extends upwardly through an opening (37) at the upper ends of said coupling beams (36) to provide additional coupling engagement between said male and female coupling frames;

(d) engagement and disengagement of said male and female coupling frames being effected by actuating, from said driver's seat, said hydraulic lift means and an hydraulic operating cylinder on a top link of said coupling arrangement, the upper portion of said male coupling frame being inclined rearwardly to move said guide projection (24) between said coupling means (36), and into engagement with said opening (37) upon lifting of said female frame toward said male frame;

(e) power transmission from said tractor to said implement being effected between said coupling beams (36) and said guide beams (22), and between said coupling hooks (35) and said catch hooks (21).

2. An arrangement according to claim 1, wherein the upper portion of said female coupling frame is provided with a rear wall (38) which reinforces said frame and facilitates coupling together of said male and female frames.

3. Arrangement according to claim 1, comprising rotatably spring-loaded latches (26) on said male coupling frame which in the coupled position lock said male and female coupling frames together and which can be rotated out of the way for disengagement.

4. Arrangement according to claim 3, wherein said latches (26) can be rotated out of the way by actuating operating means from said driver's seat.

5. Arrangement according to claim 3, wherein each of said latches (26) is provided with a lever (30) visible from said driver's seat and indicating by its position whether said latches are in locking position.

* * * * *